United States Patent [19]

Nelson

[11] Patent Number: 4,856,934
[45] Date of Patent: Aug. 15, 1989

[54] BEACH BUILDER BLOCK

[75] Inventor: Merlin L. Nelson, Kenosha, Wis.

[73] Assignee: Nellco, Inc., Cadillac, Mich.

[21] Appl. No.: 82,848

[22] Filed: Aug. 6, 1987

[51] Int. Cl.$^4$ ............................................... E02B 3/06
[52] U.S. Cl. ......................................... 405/33; 405/30
[58] Field of Search ....................... 405/16, 21, 25, 29, 405/30, 31, 33, 34, 35

[56] References Cited

U.S. PATENT DOCUMENTS

| 1,175,962 | 3/1916 | Latham | 405/31 |
| 2,384,207 | 9/1945 | Stoye | 405/33 |
| 3,347,048 | 10/1967 | Brown et al. | 405/16 |
| 3,490,239 | 1/1970 | Vincent | 405/31 |
| 4,347,017 | 8/1982 | Chevallier | 405/33 |
| 4,367,978 | 1/1983 | Schaaf et al. | 405/30 |
| 4,498,805 | 2/1985 | Weir | 405/31 |
| 4,708,521 | 11/1987 | Kocourek | 405/31 |

FOREIGN PATENT DOCUMENTS

| 479848 | 11/1975 | U.S.S.R. | 405/21 |
| 478094 | 12/1975 | U.S.S.R. | 405/30 |
| 1133328 | 1/1985 | U.S.S.R. | 405/30 |
| 877057 | 9/1961 | United Kingdom . | |

Primary Examiner—David H. Corbin
Attorney, Agent, or Firm—Price, Heneveld, Cooper, DeWitt & Litton

[57] ABSTRACT

The specification discloses a beach builder block and a method for using same wherein the beach builder block includes a front face inclined at an angle of from about 20 to about 40 degrees and a horizontal wave divider located above the front face and also including an inclined front face, inclined at an angle of from about 20 to about 60 degrees, therebeing a space between the horizontal wave divider and the first inclined front face. This block is located in the water such that the water level is approximately at the top of said inclined front face or just slightly below it, and such that the inclined face faces seaward, away from the shore. In this manner, incoming waves pass in part through the opening between the horizontal wave divider and the inclined first face, and in part up and over the horizontal wave divider whereby the two different wave portions are traveling in somewhat different directions when they collide on the rear side of the builder block, thereby further dissipating wave energy and allowing sand carried by the waves to settle out in the area behind the beach builder block and rebuild the shoreline.

42 Claims, 1 Drawing Sheet

U.S. Patent    Aug. 15, 1989    4,856,934
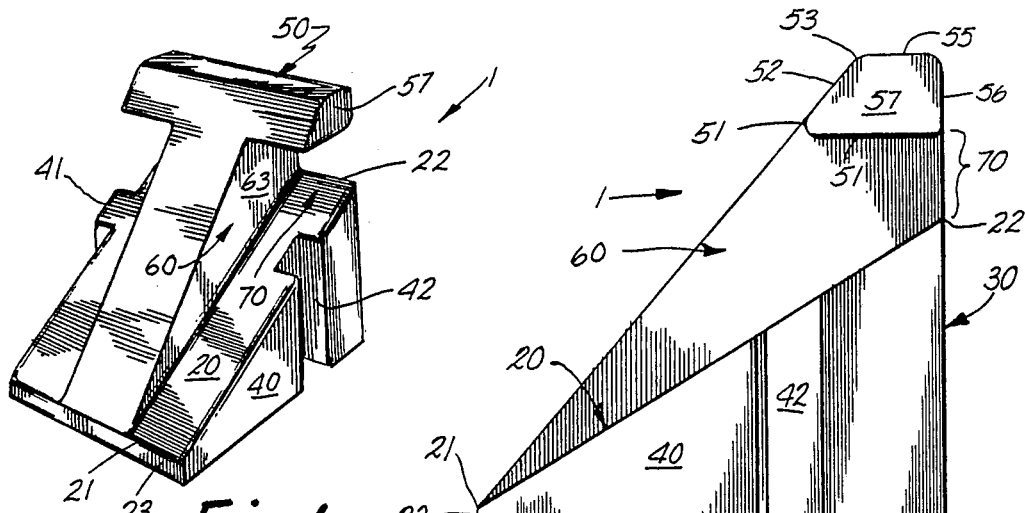
Fig. 1.
Fig. 2.
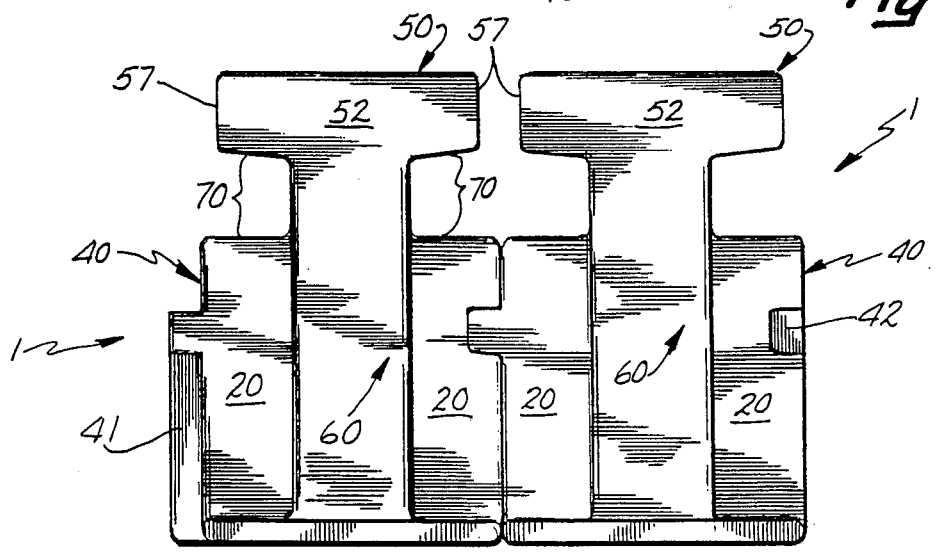
Fig. 3.
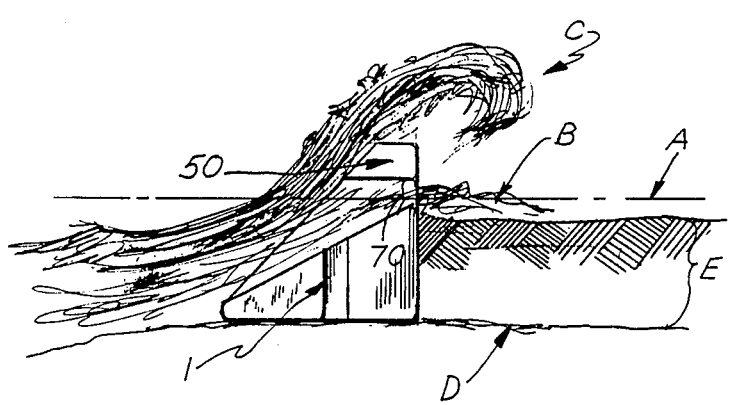
Fig. 5.
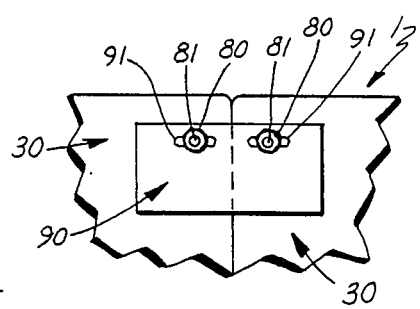
Fig. 4.

BEACH BUILDER BLOCK

BACKGROUND OF THE INVENTION

The present invention relates to lakeshore erosion. Typically, people attempt to stop such erosion by building seawalls. Such seawalls may be cast concrete or they may be heavy wood timbers, secured to pilings driven into the lake bed.

One problem with such seawalls is that the energy of an incoming wave goes straight down against the front of the wall as well as straight up. As a result, a depression develops in front of the seawall and it eventually sinks or collapses. Sometimes beach builds behind such seawalls for a time, but it tends to come and go.

Other more complicated devices have been tried with similarly mixed results. Recognizing the tendency of concrete blocks placed in the water to get undermined in the same manner as poured seawalls or wooden seawalls, one prior artisan has molded concrete "jacks" which have a plurality of projections radiating outwardly from a center. Such devices allow water to flow through while breaking up a wave to some extent. However, such devices do not consistently result in beach building up behind such devices. Basically, they tend to slow erosion rather than resulting in a reversal of the erosion process.

Soviet Union Pat. No. 1,133,328 discloses a beach block having a sloped front wall which terminates at its top in an upwardly projecting vertical front face. The block is designed for placing in the water with the water level at the top of the sloped front face and with the vertical wall projecting above the water level. There are apertures in the vertical wall to allow some water through. The Russian shows a plurality of the blocks positioned in the water in spaced relationship, rather than being joined together.

While some water containing sand is allowed through the openings in the vertical front wall of the block, the vertical wall tends to throw much of the wave water and the sand it contains back out toward the open sea. Also, it is believed that ice would tend to form within the openings in the vertical front wall and thereby tend to lift and move the blocks about during the wintertime. While it is not known whether or not the blocks of this device have ever been commerically used, it is believed that they would not perform satisfactorily to reverse lakeshore erosion.

SUMMARY OF THE INVENTION

The present invention comprises a beach builder block which includes not only a front face inclined at an angle of from about 20 to 40 degrees with respect to its bottom, but also a horizontal wave divider positioned above the front face in the vicinity of its upper edge and including its own front face inclined at an angle of from about 20 to about 60 degrees with respect to the bottom wall of the building block. The horizontal wave divider is approximately as wide as the front face of the block and is positioned thereabove so as to define an opening between the front face of the block and the wave divider which is sufficiently large to allow a significant portion, but not all, of a large wave through the opening.

By placing such blocks in the water in adjoined side-by-side fashion with the normal water level located approximately at the bottom of the opening between the front face of the block and the horizontal wave divider, one can substantially rebuild the shoreline behind this wall of blocks. The upwardly sloping front face tends to dissipate wave energy upwardly, preventing depressions from forming in front of the blocks. The horizontal wave divider not only breaks up wave energy, but also allows water containing sand to flow over its inclined front face. The water breaking over the top of the wave divider has a greater downward force component than the water passing through the opening, and the meeting of the two tends to further neutralize some of the water's energy, thereby causing sand carried by the water to settle out in the area located behind the beach builder blocks of the present invention.

Further by having an inclined front face, the horizontal wave divider of the block of the present invention tends to allow ice to build up on top of it as well as in the opening between it and the inclined front face of the builder block. Ice on top of the block tends to weight it down and counteract the tendency of ice below the water line to lift up the block. Hence the blocks of the present invention, especially when joined together, tend to remain fixed even during cold winter months.

These and other objects, advantages and features of the present invention will be more fully understood and appreciated by reference to the written specification and appended drawings.

BRIEF DESCRIPTION OF THE DRAWINGS

FIG. 1 is a perspective view of a beach builder block made in accordance with the present invention;

FIG. 2 is a side elevational view thereof;

FIG. 3 is a front elevational view of two such beach builder blocks secured together in side-by-side relation;

FIG. 4 is a fragmentary rear elevational view of two blocks joined together at their upper corners; and FIG. 5 is a side view illustrating placement of the blocks of the present invention in a lake and illustrating the manner in which beach builds up behind the blocks.

DESCRIPTION OF THE PREFERRED EMBODIMENT

In the preferred embodiment, block 1 of the present invention comprises a bottom 10 and an upwardly sloping front face 20, framed by sides 40 and terminating at a generally vertical back wall 30 (FIGS. 1 and 2). Horizontal wave divider 50 is positioned above front face 20 in the vicinity of the upper edge 22 thereof and includes its own inclined front face 52. Horizontal wave divider 50 is supported in spaced relation to front face 20 by a wave divider support rib 60 so as to define a wave opening 70 between horizontal wave divider 50 and front face 20 on either side of vertical wave divider support rib 60 (FIGS. 1, 2 and 3). In use, blocks 1 are held together by a tongue 41 and groove 42 arrangement and by backplate assembly 90 (FIGS. 3 and 4).

Blocks 1 are preferably formed of steel reinforced concrete or equivalent material. Front face 20 extends from a lower edge 21 to an upper edge 22 at an angle of from about 20 to about 40 degrees, and most preferably about 30 degrees with respect to the generally flat bottom 10 of block 1. The sharp angle between front face 20 and bottom 10 is rounded off to avoid a weak area susceptible to chipping, thereby creating a relatively narrow front vertical wall 23 located below the front edge 21 of inclined front face 20. Inclined front face 20 directs the energy of an incoming wave substantially entirely upwardly, rather than both upwardly and downwardly as happens when a wave hits a vertical front wall.

Back wall 30 extends directly downwardly from the upper edge 22 of front face 20 in a generally vertical orientation. Water carrying sand over the top of upper edge 22 tends to deposit it in the space behind generally vertical rear wall 30.

Sidewalls 40 are also generally vertical so that blocks 1 can be placed in closely adjacent side-by-side relationship to one another. Wall 40 on one side includes a generally vertical tongue 41 projecting laterally therefrom while the wall 40 on the other side includes a mating groove 42 for receiving the tongue 41 of an adjacent block. Groove 42 is slightly wider at its opening than at its base to facilitate insertion of tongue 41 therein. Tongue 41 is sufficiently large and strong to resist movement between adjacent blocks without breaking off.

Horizontal wave divider 50 is positioned in spaced relationship above inclined front face 20, and includes a generally vertical rear wall 56 which is approximately in alignment with rear wall 30. Wave divider 50 includes its own inclined front face 52, inclined at an angle of from about 20 to about 60 degrees with respect to bottom 10 and most preferably at an angle of approximately 50 degrees with respect to bottom 10. Horizontal wave divider 50 is spaced from front face 20 such that at all points, there is an opening 70 therebetween through which a significant portion, but not all, of the water of a large wave can pass.

Preferably, horizontal wave divider 50 extends forwardly to the front of upper rear edge 22 of front face 20 a distance of from about one-quarter to about one-half, and preferably about one-third of the length of a horizontal line extending from a vertical line passing through upper edge 22 to a vertical line passing through lower front edge 21 of front face 20. In the preferred embodiment, this is the length from front to rear of bottom surface 10 of block 1. This arrangement facilitates that aspect of the wave divider action wherein a portion of the wave passes through opening 70 while another portion passes over the top of horizontal wave divider 50 and falls downwardly, thereby resulting in two streams having somewhat different directions which tend to neutralize the energy in each.

It is also preferable that horizontal wave divider 50 include a generally flat, horizontal upper surface 55 extending rearwardly from the upper edge 53 of wave divider front face 52 to its juncture with generally vertical rear wall 56. This generally flat surface is preferably at least about half the width of wave divider 50 from the front to the rear thereof and provides an upper surface upon which ice can build up above the water level to thereby add weight to block 1 in the wintertime.

Horizontal wave divider 50 also preferably includes a bottom wall 51 oriented at a shallower angle, preferably generally horizontally, than the angle of inclined front face 20. This insures that at all points, the opening between horizontal wave divider 50 and inclined front face 20 will be at least as large in vertical cross section as it is between the bottom edge of its rear wall 56 and the top edge 22 of inclined front face 20. Perhaps more significantly, the opening between the bottom 51 of horizontal wave divider 50 and sloping front face 20 decreases in cross-sectional area as one proceeds rearwardly towards rear face 30 such that the stream of water passing through opening 70 accelerates somewhat, thereby whisking suspended sand particles rearwardly through opening 70 into the space behind builder block 1. This arrangement is believed to enhance the passage of sand from the front side of builder block 1 to the rear thereof.

Horizontal wave divider 50 is approximately as wide as the width of front face 20, terminating at sidewalls 57. However preferably, horizontal wave divider 50 is slightly narrower than front wall 20 so as to leave a space between adjacent sidewalls 57 of adjacent blocks 60 (FIG. 3). This insures that any slight movement between adjacent blocks 1 will not cause collision between horizontal wave dividers 50 at the sides 57 thereof, which collision might result in damage to horizontal wave dividers 50.

Horizontal wave divider 50 is supported above front face 20 by a vertical wave divider/support rib 60. Support rib 60 itself has a front face 61 extending from a lower edge generally in line with lower edge 21 of front face 20 to an upper edge at its juncture with horizontal wave divider 50. The angle of incline of face 61 is preferably greater than the angle of incline of front face 20 so that it diverges gradually upward and away from front face 20. Preferably, this angle is between 30 and 60 degrees, and is most preferably the same as the angle of front face 52 of horizontal wave divider 50, i.e., approximately 50 degrees. The width of vertical wave divider 60 between its sidewalls 62 is approximately one-third of the width of builder block 1.

Adjacent builder blocks 1 are held together not only by the tongue in groove arrangement (FIG. 3), but also by a backplate connector 90 (FIG. 4). Specifically, each builder block 1 is made with an embedded bolt 80 projecting outwardly from the upper rear corner thereof. When two blocks are placed adjacent one another as in FIG. 3, a backplate 90 having spaced horizontal slots 91 is put in position over projecting bolts 80. Slots 91 are sufficiently long and are located such that slight misalignment between adjacent blocks 1 will not prevent backplate 90 from being placed in position over projecting bolts 80. Once plate 90 is in position, suitable washers and nuts 81 are threaded over bolts 80 to firmly hold backplate 90 against the rear walls 30 of adjacent builder blocks 1.

While the dimensions of builder blocks 1 can vary, the dimensions of a block made in accordance with the best mode currently contemplated are based basically on a six by six by five foot block. The length of base 10 from front to back is six feet. The height of block 1 to the top surface 55 of horizontal wave divider 50 is six feet. The height of back wall 30 to upper edge 22 is four feet, the height of opening 70 between upper edge 22 and the bottom 51 of horizontal wave divider 50 is about one foot. The height of the rear wall 56 of horizontal wave divider 50 is one foot.

Horizontal wave divider 50 projects forwardly of rear wall 30 a distance of approximately one and one-half feet. Upper horizontal wall 55 thereof is one foot wide from front to back. Tongue 41 is approximately eight inches wide from front to rear, projects approximately six inches from its sidewall 40 and is located approximately one foot seven inches forwardly of rear wall 30. Groove 42 is slightly larger to accomodate tongue 41, being approximately ten inches wide at its opening and approximately seven inches deep. It is located one foot six inches forwardly of rear wall 30.

The overall width of the best mode block 1 is approximately five feet, with front face 20 occupying one foot six inches on either side of vertical wave divider/supporting rib 61 and with rib 61 being approximately two feet wide. Horizontal wave divider 50 is four foot six inches between its end walls 57. This best mode block weighs approximately 14,000 pounds and is made of six bag, air entrained 4,000 psi concrete mix reinforced with steel.

Builder blocks 1 can be premanufactured at a manufacturing plant, or they can be poured on the job site. They can easily be lifted into place using a crane such that a two hundred to two hundred fifty foot seawall made of beach builder blocks 1 can be finished in a couple of days. If desired, the beach blocks can be removed after a beach has been restored and can be placed in storage or located at another site.

In use, blocks 1 are placed in the lake at such a depth that the lower portion thereof is submerged. The water level should be from slightly below to approximately the level of upper edge 22 of front face 20, which in the case of the best mode block would be from about three and one-half to about four feet. The best mode block dimensioned as described above would thus be placed in approximately four feet of water. Inclined face 20 would be oriented so as to face the open sea, and vertical rear wall 30 would be oriented to face rearwardly towards the shore.

Adjacent blocks would be oriented with tongues 41 located in grooves 42. They would then be bolted together using backplate assembly 90 as described above.

With the blocks thus placed and firmly interconnected, waves approaching beach builder block 1 will pass in part through opening 70, carrying sand into the space behind builder blocks 1. The energy of the approaching wave will be diverted substantially entirely upwardly as a result of inclined front face 20.

That portion of the wave not passing through opening 70 will be diverted upwardly by the inclined front face 61 of vertical wave divider/support 60, and by the inclined front face 52 of horizontal wave divider 50. This upwardly and rearwardly diverted portion of the wave will then pass over the top of horizontal wave divider 50 and will fall downwardly with a greater vertical component than that portion of the wave passing through opening 70. These two wave portions will reunite behind beach builder block 1 and their somewhat divergent interferring paths will help to further neutralize the energy of the incoming wave. Sand will settle out behind beach builder blocks 1 and will cause the shoreline to build up behind builder blocks 1. Further, sand builds up not only behind beach builder blocks 1, but somewhat in front of them, thereby helping to further anchor them in place.

Referring to FIG. 5, the phantom line A marks the normal water level. Wave portion B is passing through opening 70 and wave portion C is passing over the top of horizontal wave divider 50. The original lake bed is at D and the newly built up lake shore behind builder blocks 1 is indicated at E.

In the wintertime, ice tends to pile up on front face 20 and on the upper flat surface 55 of horizontal wave divider 50. The collection of ice on top of wave divider 50 is above the water level and hence tends to add weight to beach builder block 1, offsetting any buoyancy due to a buildup of ice at the water level underneath wave divider 50.

In one experimental installation of the present invention in Lake Michigan, a wall of beach builder blocks 1 were located approximately fifty feet from shore to protect one hundred ten feet of shoreline. After only one week, new beach extended six feet out from the original shoreline. After five weeks, it was approximately twenty-five feet from shore and after nine weeks, the new beach extended all the way out to the wall of beach builder blocks 1. The beach extended from a depth of approximately three feet at the blocks rearwardly to the shore at an average upward angle of 10 to 15 degrees. In a second experimental installation in Grand Traverse Bay, as much as eighty feet of beach was rebuilt in less than four months.

Hence, the present invention provides an extremely economical way to not only prevent further erosion, but actually reverse lakeshore erosion and build beach. This beach buildup is surprisingly rapid and is secure. Of course, it is understood that the above is merely a preferred embodiment of the invention and that various changes and departures can be made without departing from the spirit and broader aspects thereof.

The embodiments of the invention in which an exclusive property or privilege is claimed are defined as follows:

1. A beach builder block comprising:
   a bottom;
   a first front face inclined upwardly from a leading lower edge to an upper edge at an angle of from about 20 to about 40 degrees with respect to said bottom;
   a vertical wave divider rib projecting upwardly from approximately the middle of said first front face and being approximately one-third the width of said first front face, said rib including an inclined rib front face extending upwardly generally from said bottom leading edge of said first front face to a point above the upper edge of said first front face and being approximately one-third the width of said first front face, and being inclined at an angle of from about 30 to about 60 degrees with respect to said bottom and greater than said angle of inclination of said first front face.

2. The beach builder block of claim 1 in which said vertical wave divider rib supports a horizontal wave divider above said first front face in the vicinity of said upper edge of said front face so as to define an opening between said front face and said horizontal wave divider on either side of said wave divider rib which is sufficiently large to allow a significant portion, but not all, of a large wave to pass therethrough, said horizontal wave divider being approximately as wide as said first front face and including a second front face inclined upwardly from a leading lower edge to an upper edge at an angle of from about 20 to about 60 degrees with respect to said bottom of said beach builder block.

3. The beach builder block of claim 2 in which said second inclined front face is inclined at an angle of from about 40 to about 60 degrees.

4. The beach builder block of claim 3 in which said second and said rib inclined front faces have the same angle of inclination.

5. The beach builder block of claim 4 in which the angle of inclination of said first front face is 30 degrees and said angle of inclination of said second and said rib front face are 50 degrees.

6. The beach builder block of claim 5 in which said horizontal wave divider includes a bottom oriented at an angle with respect to said bottom of said beach builder block which is less than the angle of inclination of said front face to thereby define a passage between said wave divider bottom and said front face which narrows as one proceeds from the front of said beach builder block towards the rear thereof.

7. The beach builder block of claim 6 in which said angle of orientation of said bottom of said horizontal wave divider is zero, such that said bottom of said horizontal wave divider is oriented generally parallel to said bottom of said beach builder block.

8. The beach builder block of claim 7 in which said horizontal wave divider is slightly narrower than the width of said front face.

9. The beach builder block of claim 8 which includes means for positively joining adjacent beach builder blocks together to create a continuous wall thereof.

10. The beach builder block of claim 9 in which said joining means include a tongue on one sidewall of each of said beach builder blocks and a mating groove on the other sidewall thereof whereby adjacent beach builder blocks can be joined in tongue and groove relationship with respect to one another.

11. The beach builder block of claim 10 in which said joining means includes each of said beach builder blocks including a bolt projecting outwardly from the rear face thereof near each side thereof, a backplate having a pair of spaced slots therein being secured to a pair of adjacent beach builder blocks with one of said slots fitting over one of said bolts on one block and the other of said slots fitting over an adjacent bolt projecting from an adjacent block, said plate being firmly held in place against said back walls of said blocks by nuts threaded on said bolts.

12. The beach builder block of claim 11 in which said horizontal wave divider extends forwardly of said upper edge of said inclined first front face a distance of from about one-fourth to about one-half of the horizontal distance from a vertical plane intersecting said upper edge of said inclined front face to a vertical plane intersecting said lower edge of said first inclined front face.

13. The beach builder block of claim 5 in which said horizontal wave divider extends forwardly of said upper edge of said inclined first front face a distance of from about one-fourth to about one-half of the horizontal distance from a vertical plane intersecting said upper edge of said inclined front face to a vertical plane intersecting said lower edge of said first inclined front face.

14. The beach builder block of claim 5 which includes means for positively joining adjacent beach builder blocks together to create a continuous wall thereof.

15. The beach builder block of claim 5 in which said horizontal wave divider is slightly narrower than the width of said front face.

16. The beach builder block of claim 2 in which said horizontal wave divider extends forwardly of said upper edge of said inclined first front face a distance of from about one-fourth to about one-half of the horizontal distance from a vertical plane intersecting said upper edge of said inclined front face to a vertical plane intersecting said lower edge of said first inclined front face.

17. The beach builder block of claim 1 which includes means for positively joining adjacent beach builder blocks together to create a continuous wall thereof.

18. The beach builder block of claim 17 in which said joining means include a tongue on one sidewall of each of said beach builder blocks and a mating groove on the other sidewall thereof whereby adjacent beach builder blocks can be joined in tongue and groove relationship with respect to one another.

19. The beach builder block of claim 18 in which said joining means includes each of said beach builder blocks including a bolt projecting outwardly from the rear face thereof near each side thereof, a backplate having a pair of spaced slots therein being secured to a pair of adjacent beach builder blocks with one of said slots fitting over one of said bolts on one block and the other of said slots fitting over an adjacent bolt projecting from an adjacent block, said plate being firmly held in place against said back walls of said blocks by nuts threaded on said bolts.

20. The beach builder block of claim 2 in which said horizontal wave divider is slightly narrower than the width of said front face.

21. The beach builder block of claim 20 in which said horizontal wave divider extends forwardly of said upper edge of said inclined first front face a distance of from about one-fourth to about one-half of the horizontal distance from a vertical plane intersecting said upper edge of said inclined front face to a vertical plane intersecting said lower edge of said first inclined front face.

22. The beach builder block of claim 2 in which said horizontal wave divider includes a bottom oriented at an angle with respect to said bottom of said beach builder block which is less than the angle of inclination of said front face to thereby define a passage between said wave divider bottom and said front face which narrows as one proceeds from the front of said beach builder block towards the rear thereof.

23. The beach builder block of claim 1 in which said first front face is inclined at about 30 degrees and said rib front face is inclined at about 50 degrees.

24. A method for building a shoreline comprising:
locating a first front face in the water facing seaward and inclining said face upwardly from a leading lower edge generally adjacent the lake bottom to an upper edge at an angle of from about 20 to about 40 degrees with respect to horizontal; providing a vertical wave divider rib projecting upwardly from approximately the middle of said first front face and being approximately one-third the width of said first front face, said rib including an inclined rib front face extending upwardly generally from said bottom leading edge of said first front face to a point above the upper edge of said first front face and being approximately one-third the width of said first front face, and being inclined at an angle of from about 30 to about 60 degrees with respect to said bottom and greater than said angle of inclination of said first front face;
locating said first front face at a depth such that the normal water level is approximately at or just slightly below the level of said upper leading edge of said inclined front face.

25. The method of claim 24 which includes supporting on said vertical wave divider rib supports a horizontal wave divider above said first front face in the vicinity of said upper edge of said front face so as to define an opening between said front face and said horizontal wave divider on either side of said wave divider rib which is sufficiently large to allow a significant portion, but not all, of a large wave to pass therethrough, said horizontal wave divider being approximately as wide as said first front face and including a second front face inclined upwardly from a leading lower edge to an upper edge at an angle of from about 20 to about 60 degrees with respect to said bottom of said beach builder block.

26. The method of claim 25 in which said second inclined front face is inclined at an angle of from about 40 to about 60 degrees.

27. The method of claim 26 in which said second and said rib inclined front faces have the same angle of inclination.

28. The method of claim 27 in which said first front face is inclined at 30 degrees and second and said rib front faces are inclined at 50 degrees.

29. The method of claim 28 which includes providing said horizontal wave divider with a bottom oriented at an angle with respect to horizontal which is less than the angle of inclination of said front face to thereby define a passage between said wave divider bottom and said front face which narrows as one proceeds from the front of said first face towards the rear thereof.

30. The method of claim 29 in which said angle of orientation of said bottom of said horizontal wave divider is zero, such that said bottom of said horizontal wave divider is oriented generally horizontally.

31. The method of claim 30 in which said horizontal wave divider is slightly narrower than the width of said first front face.

32. The method of claim 31 which includes positively joining adjacent beach builder blocks together to create a continuous wall thereof.

33. The method of claim 32 which includes extending said horizontal wave divider forwardly of said upper edge of said inclined first front face a distance of from about one-fourth to about one-half of the horizontal distance from a vertical plane intersecting said upper edge of said inclined front face and a vertical plane intersecting said lower edge of said first inclined front face.

34. The method of claim 28 which includes extending said horizontal wave divider forwardly of said upper edge of said inclined first front face a distance of from about one-fourth to about one-half of the horizontal distance from a vertical plane intersecting said upper edge of said inclined front face and a vertical plane intersecting said lower edge of said first inclined front face.

35. The method of claim 28 which includes positively joining adjacent beach builder blocks together to create a continuous wall thereof.

36. The method of claim 28 in which said horizontal wave divider is slightly narrower than the width of said first front face.

37. The method of claim 25 which includes extending said horizontal wave divider forwardly of said upper edge of said inclined first front face a distance of from about one-fourth to about one-half of the horizontal distance from a vertical plane intersecting said upper edge of said inclined front face and a vertical plane intersecting said lower edge of said first inclined front face.

38. The method of claim 24 which includes positively joining adjacent beach builder blocks together to create a continuous wall thereof.

39. The method of claim 25 in which said horizontal wave divider is slightly narrower than the width of said first front face.

40. The method of claim 39 which includes extending said horizontal wave divider forwardly of said upper edge of said inclined first front face a distance of from about one-fourth to about one-half of the horizontal distance from a vertical plane intersecting said upper edge of said inclined front face and a vertical plane intersecting said lower edge of said first inclined front face.

41. The method of claim 25 which includes providing said horizontal wave divider with a bottom oriented at an angle with respect to horizontal which is less than the angle of inclination of said front face to thereby define a passage between said wave divider bottom and said front face which narrows as one proceeds from the front of said first face towards the rear thereof.

42. The method of claim 24 in which said first front face is inclined at about 30 degrees and said rib front face is inclined at about 50 degrees.

* * * * *